(12) United States Patent
Samuels

(10) Patent No.: US 10,489,053 B2
(45) Date of Patent: Nov. 26, 2019

(54) METHOD AND APPARATUS FOR ASSOCIATING USER IDENTITY

(75) Inventor: John Samuels, Lancashire (GB)

(73) Assignee: Gula Consulting Limited Liability Company, Dover, DE (US)

(*) Notice: Subject to any disclaimer, the term of this patent is extended or adjusted under 35 U.S.C. 154(b) by 521 days.

(21) Appl. No.: 12/274,919

(22) Filed: Nov. 20, 2008

(65) Prior Publication Data

US 2010/0125905 A1  May 20, 2010

(51) Int. Cl.
*G06F 3/00* (2006.01)
*G06F 3/0488* (2013.01)

(52) U.S. Cl.
CPC .............................. *G06F 3/04886* (2013.01)

(58) Field of Classification Search
CPC .... G06F 3/00; G06F 3/04883; G06F 3/04845; G06F 3/0488; G06F 3/0482; G06F 3/0485; G06F 3/04842; G06F 2203/04803; G06F 3/04886; G06F 3/04817; G06F 2203/04806; G06F 3/0481; G06F 3/0486; G06F 3/0416; G06F 3/0414; G06F 16/54; G06F 3/016; G06F 3/04847; G06F 2203/04104; G06F 2203/04105; G06F 3/0233; G06F 3/0484
USPC ................... 715/778, 761, 780, 856
See application file for complete search history.

(56) References Cited

U.S. PATENT DOCUMENTS

| | | | |
|---|---|---|---|
| 4,720,703 A * | 1/1988 | Schnarel, Jr. ............ | G09G 5/14 345/163 |
| 5,289,574 A * | 2/1994 | Sawyer ......................... | 715/759 |
| 5,742,285 A * | 4/1998 | Ueda ............................. | 715/778 |
| 6,466,232 B1 | 10/2002 | Newell et al. | |
| 6,686,936 B1 * | 2/2004 | Nason et al. ................. | 715/778 |
| 6,795,967 B1 * | 9/2004 | Evans ..................... | G06F 21/31 717/121 |
| 6,807,666 B1 * | 10/2004 | Evans ................... | G06F 9/4443 715/778 |
| 6,826,755 B1 | 11/2004 | Kabir et al. | |
| 6,828,991 B2 * | 12/2004 | Nason et al. ................ | 715/778 |
| 7,102,643 B2 * | 9/2006 | Moore .................... | G06T 13/80 345/419 |
| 7,181,441 B2 | 2/2007 | Mandato et al. | |
| 7,225,409 B1 | 5/2007 | Schnarel et al. | |
| 7,324,528 B2 | 1/2008 | Szlam | |
| 7,519,918 B2 * | 4/2009 | Trantow ........................ | 715/778 |
| 7,594,185 B2 * | 9/2009 | Anderson et al. ............ | 715/778 |
| 7,626,587 B1 * | 12/2009 | de Waal et al. .............. | 345/536 |
| 7,822,980 B2 * | 10/2010 | Botz et al. .................... | 713/167 |

(Continued)

OTHER PUBLICATIONS

Use of multiple SIM cards in mobile phones, by consumers in Italy, Finland & Portugal—Summary of Oftel Research, , Apr.-May 2001, 13 Pages, World Wide Webpage: http://www.ofcom.org.uk/static/archive/oftel/publications/research/2001/sim0701.htm.

(Continued)

*Primary Examiner* — Di Xiao
(74) *Attorney, Agent, or Firm* — Panitch Schwarze Belisario & Nadel LLP

(57) ABSTRACT

In accordance with an example embodiment of the present invention, an apparatus, comprising a processor configured to associate a first virtual screen with a first user identity receive input for transitioning from the first virtual screen to a second virtual screen, and associate the second virtual screen with a second user identity based at least in part on the input is disclosed.

28 Claims, 4 Drawing Sheets

(56) References Cited

U.S. PATENT DOCUMENTS

| | | | |
|---|---|---|---|
| 7,891,011 B1* | 2/2011 | Thenthiruperai et al. | 726/30 |
| 8,023,485 B2* | 9/2011 | Shi et al. | 370/338 |
| 8,060,918 B2* | 11/2011 | Itoi et al. | 726/6 |
| 8,108,782 B2* | 1/2012 | Rajpal et al. | 715/761 |
| 8,117,649 B2* | 2/2012 | Hardt | 726/6 |
| 2002/0181398 A1 | 12/2002 | Szlam | |
| 2002/0194297 A1 | 12/2002 | Jen et al. | |
| 2003/0080980 A1* | 5/2003 | Riek et al. | 345/646 |
| 2003/0229783 A1* | 12/2003 | Hardt | 713/155 |
| 2004/0174398 A1* | 9/2004 | Luke et al. | 345/856 |
| 2005/0022204 A1* | 1/2005 | Kabir | H04L 29/12594 718/108 |
| 2005/0108239 A1* | 5/2005 | Evans | G06F 21/31 |
| 2005/0108372 A1 | 5/2005 | Guo et al. | |
| 2005/0130641 A1 | 6/2005 | Scott | |
| 2006/0015819 A1 | 1/2006 | Hawkins et al. | |
| 2006/0026535 A1* | 2/2006 | Hotelling et al. | 715/863 |
| 2006/0085760 A1* | 4/2006 | Anderson et al. | 715/778 |
| 2007/0104182 A1 | 5/2007 | Gorti et al. | |
| 2007/0118892 A1* | 5/2007 | Sastry et al. | 726/10 |
| 2007/0150842 A1* | 6/2007 | Chaudhri et al. | 715/863 |
| 2007/0275767 A1 | 11/2007 | Steele | |
| 2008/0081609 A1* | 4/2008 | Burgan et al. | 455/425 |
| 2008/0147811 A1* | 6/2008 | Schroeder | H04L 51/36 709/206 |
| 2008/0148030 A1 | 6/2008 | Goffin | |
| 2008/0209338 A1 | 8/2008 | Li | |
| 2009/0034514 A1 | 2/2009 | Hawkins et al. | |
| 2009/0182821 A1 | 7/2009 | Allen et al. | |
| 2009/0228807 A1 | 9/2009 | Lemay | |
| 2009/0235177 A1* | 9/2009 | Saul | G06F 3/0227 715/740 |
| 2009/0259691 A1 | 10/2009 | Tanskanen et al. | |
| 2010/0125654 A1 | 5/2010 | Lawton et al. | |

OTHER PUBLICATIONS

International Search Report and Written Opinion received for corresponding Patent Cooperation Treaty Application No. PCT/FI2009/050782, dated Mar. 3, 2010, 16 Pages.

Wireless networking protocols, such as 802.11, short-range wireless protocols, such as Bluetooth, and/or the like.

International Search Report and Written Opinion received in corresponding Patent Cooperation Treaty Application No. PCT/FI2009/050783, dated Mar. 16, 2010, 16 pages.

Non-Final Office action received in corresponding U.S. Appl. No. 12/274,953, dated Aug. 4, 2010, 14 pages.

Digital Photography School/Discuss, retrieved on Aug. 28, 2010, Webpage available at: http://www.flickr.com/groups/digitalps/discuss/72157594237881843/.

Global Sources Direct, "Dual Sim Card Adapter", http://www.globalsourcesdirect.com/servlet/the-1681/Dual-Sim-Card-Adapter/Detail, printed May 19, 2011.

Final Office action received in corresponding U.S. Appl. No. 12/274,953, dated Feb. 17, 2011, 14 pages.

\* cited by examiner

METHOD AND APPARATUS FOR ASSOCIATING USER IDENTITY

RELATED APPLICATIONS

This application also relates to U.S. patent application, entitled "METHOD AND APPARATUS FOR UTILIZING USER IDENTITY", which is being filed concurrently and is hereby incorporated by reference in its entirety.

TECHNICAL FIELD

The present application relates generally to user identity.

BACKGROUND

There has been a recent surge in the use of networking devices. The growth of networking devices has been accompanied by a surge in programs utilizing networks to send and receive data. For example, a program may use a network to send and/or retrieve an image, a video, a message, text, and/or the like. Utilization of a network may be associated with a user identity. A user who utilizes more than one network may utilize more than one user identity.

SUMMARY

According to a first embodiment, an apparatus comprising a processor configured to associate a first virtual screen with a first user identity, receive input for transitioning from the first virtual screen to a second virtual screen, and associate the second virtual screen with a second user identity based at least in part on the input is disclosed.

According to a second embodiment, a method comprising associating a first virtual screen with a first user identity, receiving input for transitioning from the first virtual screen to a second virtual screen, and associating the second virtual screen with a second user identity based at least in part on the input is disclosed.

According to a third embodiment, a computer program product comprising a computer-readable medium bearing computer program code embodied therein for use with a computer, the computer program code comprising associating a first virtual screen with a first user identity, receiving input for transitioning from the first virtual screen to a second virtual screen, and associating the second virtual screen with a second user identity based at least in part on the input is disclosed.

According to a fourth embodiment, a computer-readable medium encoded with instructions that, when executed by a computer, perform associating a first virtual screen with a first user identity, receiving input for transitioning from the first virtual screen to a second virtual screen, and associating the second virtual screen with a second user identity based at least in part on the input is disclosed.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
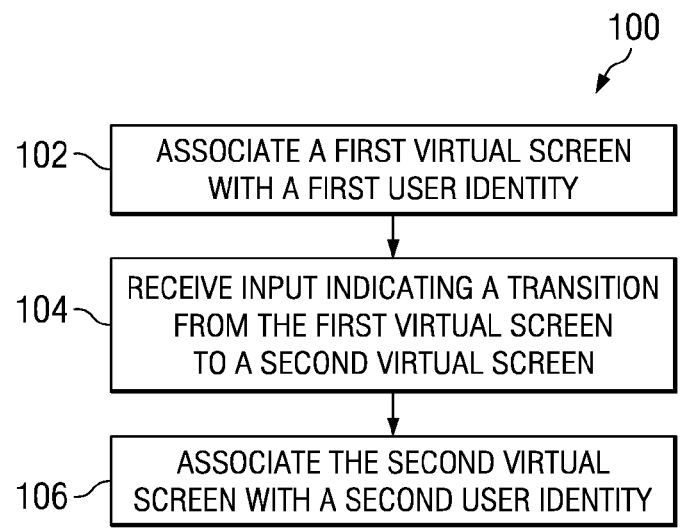
FIG. 1 is a flow diagram showing a method for using a plurality of subscriber identities according to an example embodiment.

An example embodiment of the present and its potential advantages are best understood by referring to FIGS. 1 through 7 of the drawings.

A user of an electronic device may have more than one user identity, for example, if the user utilizes more than one network, if the user has different user identities for work and personal use, and/or the like. In such a situation, the electronic device may operate with more than one user identity. Such an electronic device may allow a user to access these networks using the same device without reconfiguring user identity. For example, an electronic device may have two user identity modules (UIM) that allow the electronic device to connect to two different networks. A user may control which user identity is utilized.

A device may provide a screen that may be customized by a user. For example, a user may customize wallpaper, programs that may be readily started, information displayed, and/or the like. In some circumstances, the user may desire to access more information on the screen than is desirable to display at one time. A virtual screen may be utilized for this information. A virtual screen may be utilized so that a user may be able to view at least part of the desired information when the information may not be desirable to display at one time. For example, if a virtual screen comprises more information than displayed, the user may pan to view the non-displayed information.

A virtual screen may be associated with a user identity. For example, a user may perform some operations when utilizing a user identity, and perform different operations with utilizing a different user identity. In such an example, the different virtual screens may provide the user with a separate experience for performing operations. Furthermore, in such an example, there may be a program, such as a program stored on a subscriber identity module (SIM), which is associated with a user identity that the user may benefit from being able to start from the associated virtual screen. In another example, a user may have a different virtual screen presentation for a different user identity. In such an example, the user may be able to easily distinguish which user identity is being used by glancing at part of the virtual screen.

In an example embodiment, a user who utilizes more than one user identity may utilize them differently. For example, a user who utilizes a user identity for a personal purpose may desire to have a family photo for wallpaper, a music program that can be readily started, and/or the like. In such an example, the user may have a virtual screen arranged in this manner. In another example, a user who utilizes a user identity for business may desire to have a company logo for wallpaper, a meeting calendar shown, an email program easily startable, and/or the like. In such an example, the user may have virtual screen arranged in this manner.

On an electronic device that associates a virtual screen with a user identity, it may be desirable to switch between user identities by switching virtual screens. For example, an electronic device may switch from a user identity to a different user identity when the device receives input, for example from the user, to switch from a virtual screen to a different virtual screen. In such an example, the user can control which user identity is used by controlling which virtual screen is used. For example, the user may perform a swiping input, for example input 640 of FIG. 6C, to transition from one virtual screen and user identity to another virtual screen and another user identity. In such an example, the user may be able to transition between virtual screens and user identities without any intervening user operations related to changing the user identity, such as a login.

In an example embodiment, if a first virtual screen and a first user identity are being utilized, the electronic device utilizes information related to a second user identity. For example, in a device utilizing a first virtual screen and an associated first user identity, the electronic device may receive a message associated with a second user identity. In such an example, the electronic device may provide a notification of the message to the user.

FIG. 1 is a flow diagram showing a method 100 for using a plurality of subscriber identities according to an example embodiment of the invention. An apparatus, for example electronic device 10 of FIG. 7, may be configured to perform method 100.

At block 102, a first virtual screen is associated with a first user identity. The first virtual screen may be for example virtual screen 300 of FIG. 3A, virtual screen 546 of FIG. 5C, and/or the like. The user identity may comprise information related to a user identity module (UIM), for example, UIM 38 of FIG. 7. For example, the entirety of the user identity may be a UIM. In another example, the user identity may comprise information unassociated with any UIM. In yet another example, the user identity may comprise a UIM and additional information. The association may comprise enabling and/or utilizing at least part of the user identity. For example, the association may comprise utilizing information related to user identity for making a call, receiving a call, sending a message, receiving a message, transmitting information, receiving information, and/or the like.

At block 104, input indicating a transition from the first virtual screen to a second virtual screen is received. The input may be received from a keypad, such as keypad 30 of FIG. 7, a touch display, such as display 28 of FIG. 7, a motion sensor, such as motion sensor 68 of FIG. 7, and/or the like. The input may comprise a key press, a motion, a touch input, such as input 640 of FIG. 6C, and/or the like. The input may indicate a transition from the first virtual screen to the second virtual screen by receiving a response to a query and/or by the nature of the input. For example, receiving a selection of a menu item may indicate a transition from the first virtual screen to the second virtual screen. In another example, an input relating to a movement beyond the boundary of a virtual screen may indicate a transition from a first virtual screen to a second virtual screen, for example the transition described with reference to virtual screen 502 and virtual screen 504 of FIG. 5A.

At block 106, the second virtual screen is associated with a second user identity. The second virtual screen may be for example virtual screen 342 of FIG. 3C, virtual screen 522 of FIG. 5B, and/or the like. The user identity may comprise a user identity module (UIM), for example, UIM 38 of FIG. 7. The association may comprise enabling and/or utilizing at least part of the user identity. For example, the association may comprise utilizing information related to user identity for making a call, receiving a call, sending a message, receiving a message, transmitting information, receiving information, and/or the like.

The association with the second user identity may modify, replace, supplement, and/or the like, information related to the first user identity. For example, the association with the second user identity may result in utilization of information related to the second user identity exclusively over information related to any other user identity. In another example, the association with the second user identity may result in utilization of information related to the second user identity in some circumstances and utilization of information related to the first user identity in other circumstances. In such an example, after association with the second user identity, outgoing information transmission, calls, messages, and/or the like may utilize the second user identity, and incoming information transmission, calls, messages, and/or the like may utilize the first user identity and/or the second user identity.

Figure 2:
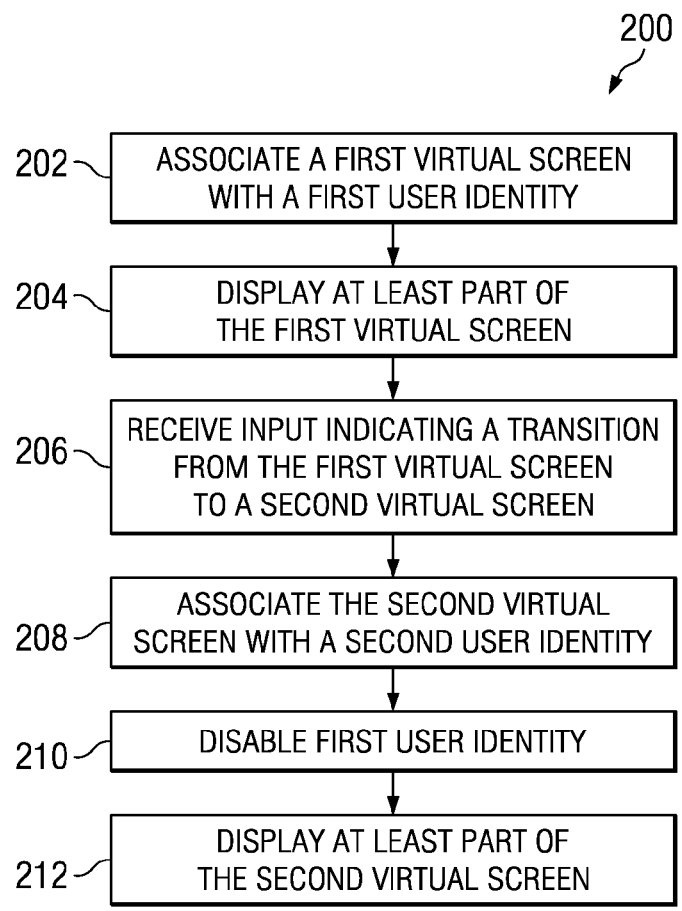
FIG. 2 is a flow diagram of another method for using a plurality of subscriber identities according to an example embodiment.

FIG. 2 is a flow diagram of another method 200 for using a plurality of subscriber identities according to an example embodiment of the invention. An apparatus, for example electronic device 10 of FIG. 7, may be configured to perform method 200.

At block 202, a first virtual screen is associated with a first user identity. The first virtual screen, association, and first user identity may be similar to the first virtual screen, association, and first user identity described with reference to block 102 of FIG. 1.

At block 204, at least part of the first virtual screen is displayed. For example, at least part of the first virtual screen may be displayed in frame 402 of FIG. 4A.

At block 206, input indicating a transition from the first virtual screen to a second virtual screen is received. The input, indication of transition, and reception may be similar to the input, indication of transition, and reception described with reference to block 104 of FIG. 1.

At block 208, the second virtual screen is associated with a second user identity. The second virtual screen and second user identity may be similar to the second virtual screen and second user identity described with reference to block 106 of FIG. 1. The association may comprise enabling and/or utilizing at least part of the user identity. For example, the association may comprise utilizing information related to user identity for making a call, receiving a call, sending a message, receiving a message, transmitting information, receiving information, and/or the like. For example, the association with the second user identity may result in utilization of information related to the second user identity exclusively over information related to any other user identity.

At block 210, the first user identity is disabled. In an example embodiment, the information related to a first user identity is, at least temporarily, no longer used. In another example embodiment, a UIM, for example UIM 38 of FIG. 7, may be disabled, turned off, put to sleep, disconnected, and/or the like.

At block 212, at least part of the second virtual screen is displayed. For example, at least part of the second virtual screen may be displayed in frame 422 of FIG. 4B.

FIGS. 3A-3D are diagrams illustrating a virtual screen according to an example embodiment of the invention.

Figure 3A:
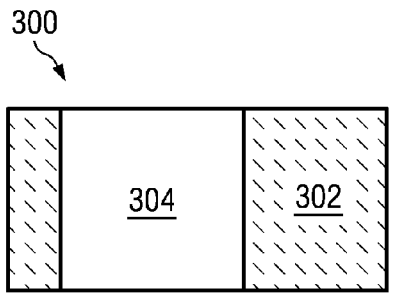
FIGS. 3A-3D are diagrams illustrating a virtual screen according to an example embodiment.
Figure 4A:
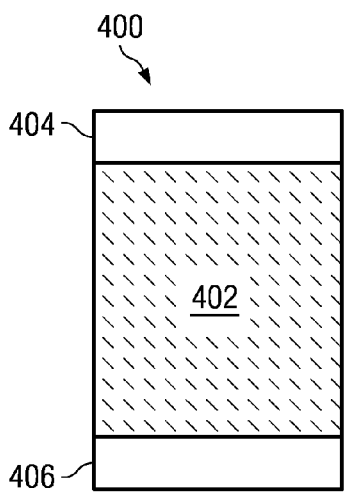
FIGS. 4A and 4B are diagrams illustrating a screen according to an example embodiment.

FIG. 3A is a diagram illustrating a virtual screen wider than the part of the virtual screen displayed, for example on screen 400 of FIG. 4A. In the example of FIG. 3A, block 302 relates to a virtual screen 300, and block 304 relates to a frame that displays part of virtual screen 300. The virtual screen 300 may represent an image, text, a group of items, a list, a work area, and/or the like. For example, if an image is wider than what is desirable to represent on a display, virtual screen 300 may be used for the image. In such an example, the frame 304 may be panned left or right to change the part of the virtual screen 300 that is displayed. In an example embodiment, changing the part of the virtual screen 300 that is displayed may be performed when input is received, for example input 620 of FIG. 6B, input 640 of FIG. 6C, and/or the like. In an example embodiment, frame 304 may be prevented from panning beyond one or more boundary of virtual screen 300.

Figure 3B:
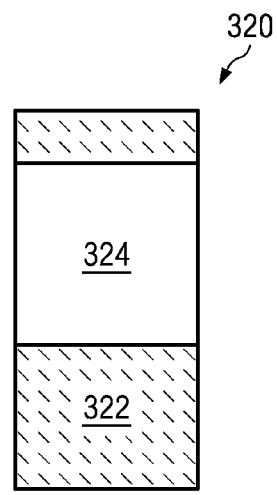
Figure 4B:
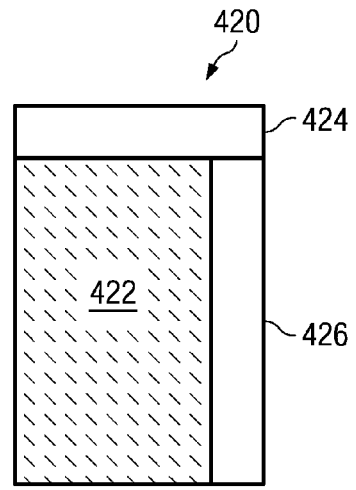

FIG. 3B is a diagram illustrating a virtual screen taller than the part of the virtual screen displayed, for example on screen 420 of FIG. 4B. In the example of FIG. 3B, block 322 relates to a virtual screen, and block 324 relates to a frame that displays part of virtual screen 320. The virtual screen 320 may represent an image, text, a group of items, a list, a work area, and/or the like. For example, if group of items, such as a group of icons, is taller than what is desirable to represent on a display, virtual screen 320 may be used for the group of icons. In such an example, the frame 324 may be panned up or down to change the part of the virtual screen 320 that is displayed. In an example embodiment, moving block 320 to change the part of the virtual screen 320 that is displayed may be performed when input is received, for example input 620 of FIG. 6B, input 640 of FIG. 6C, and/or the like. In an example embodiment, frame 324 may be prevented from panning beyond one or more boundary of virtual screen 320.

Figure 3C:
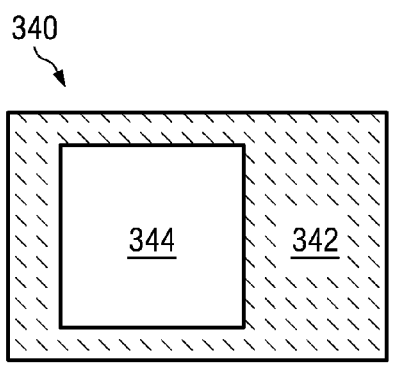

FIG. 3C is a diagram illustrating a virtual screen wider and taller than the part of the virtual screen displayed, for example on screen 400 of FIG. 4A. In the example of FIG. 3C, block 342 relates to a virtual screen 340, and block 344 relates to a frame that displays part of virtual screen 340. The virtual screen 340 may represent an image, text, a group of items, a list, a work area, and/or the like. For example, if a list is longer than what is desirable to represent on a display, virtual screen 340 may be used for the work area. In such an example, the displayed part 344 may be panned left, right, up, and/or down to change the part of the virtual screen 340 that is displayed. In an example embodiment, changing the part of the virtual screen 340 that is displayed may be performed when input is received, for example input 620 of FIG. 6B, input 640 of FIG. 6C, and/or the like. In an example embodiment, frame 344 may be prevented from panning beyond one or more boundary of virtual screen 342.

Figure 3D:
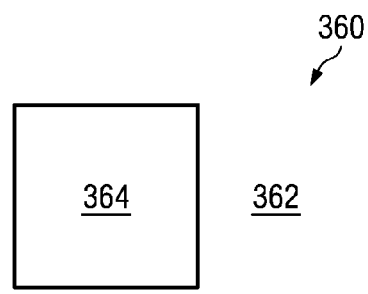

FIG. 3D is a diagram illustrating a virtual screen is the same size as the part of the virtual screen 360 displayed. In the example of FIG. 3D, block 362 relates to a virtual screen, and block 364 relates to a frame that displays part of virtual screen 360. The virtual screen 360 may represent an image, text, a group of items, a list, a work area, and/or the like. For example, if it is desirable to represent an entire image on a display, virtual screen 360 may be used to display the image.

FIGS. 4A and 4B are diagrams illustrating a screen according to an example embodiment of the invention. It should be understood that the screens of FIGS. 4A and 4B are merely examples of possible screen arrangements which may be used and therefore should not limit the scope of the present invention.

FIG. 4A is a diagram illustrating a virtual screen 400 comprising frames 402, 404, and 406. Frames 402, 404, and 406 may relate to the displayed part of virtual screen 400. For example, frame 404 may relate to frame 344 of FIG. 3C. In another example, frame 404 may relate to block 364 of FIG. 3D. In still another example, frame 406 may relate to block 304 of FIG. 3A.

In an example embodiment, frame 404 comprises device operating information, such as battery information, signal information, network information, and/or the like. In another example embodiment, frame 402 comprises icons representing programs which may be utilized, such as games, image viewers, and/or the like. In still another example embodiment, frame 406 comprises icons representing device operations which may be performed, such as composing a message, making a call, and/or the like.

FIG. 4B is a diagram illustrating a virtual screen 420 comprising frames 422, 424, and 426. Frames 422, 424, and 426 may relate to the displayed part of one or more virtual screen. For example, frame 422 may relate to block 342 of FIG. 3C. In another example, frame 404 may relate to block 364 of FIG. 3D. In still another example, frame 406 may relate to block 304 of FIG. 3A.

In an example embodiment, frame 424 comprises device operating information, such as battery information, signal information, network information, and/or the like. In another example embodiment, frame 422 comprises icons representing programs which may be utilized, such as games, image viewers, and/or the like. In still another example embodiment, frame 426 comprises icons representing device operations which may be performed, such as composing a message, making a call, and/or the like.

It should be understood that example embodiments may vary with respect to the number of frames on a screen and/or the placement of frames on a screen.

Figure 5A:
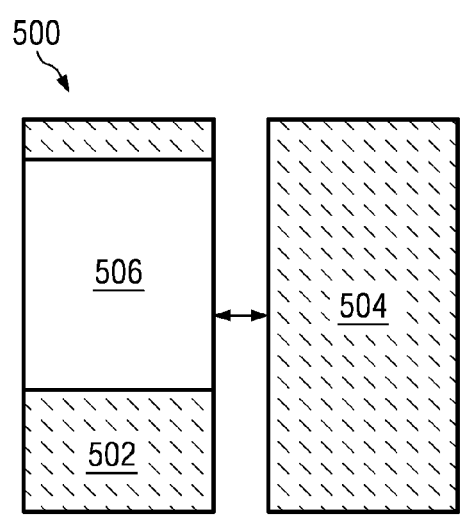
FIGS. 5A-5C are diagrams illustrating virtual locations of virtual screens according to an example embodiment.
Figure 5B:
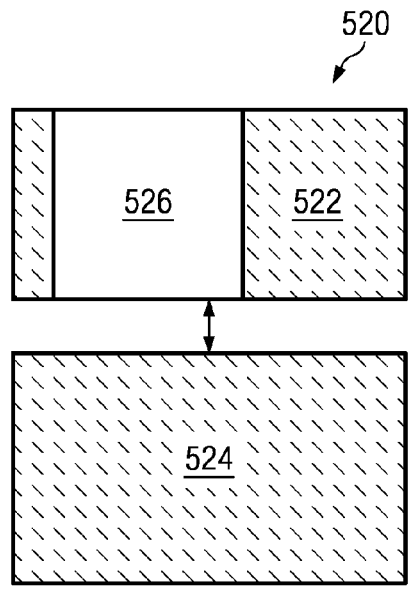
Figure 5C:
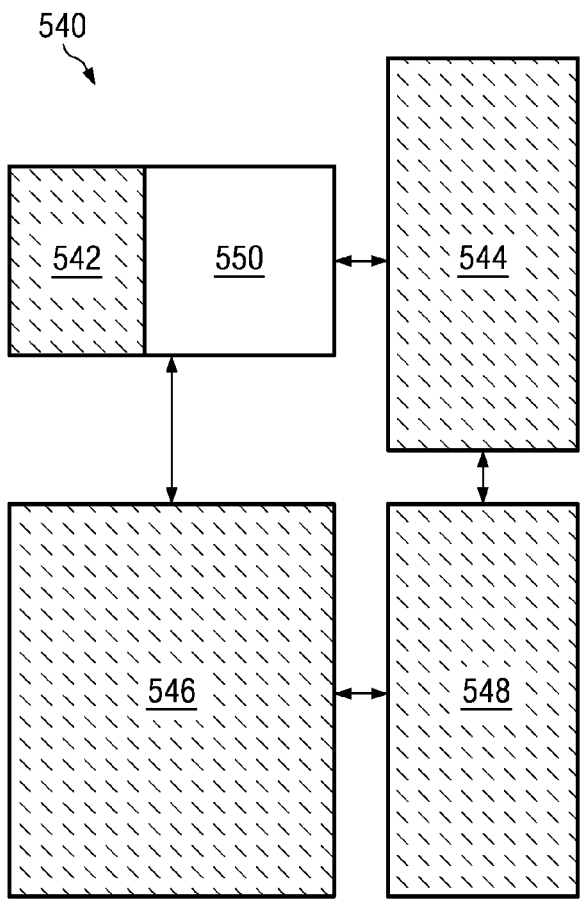

FIGS. 5A-5C are diagrams illustrating virtual locations of virtual screens according to an example embodiment of the invention. Receiving an input indicating panning beyond a boundary of a virtual screen may indicate a transition from a virtual screen to a different virtual screen. For example, if an input is received indicating panning beyond a boundary of a virtual screen towards the virtual location of a different virtual screen, the input may indicate a transition to the different virtual screen.

FIG. 5A is a diagram illustrating an arrangement 500 of virtual locations for frame 506 and virtual screens 502 and 504. Frame 506 may relate to a frame that displays part of virtual screen 502 or 504, for example similar to block 304 and block 302 of FIG. 3A. Virtual screens 502 and 504 may be related by a virtual location. For example, in the example of FIG. 5A, virtual screen 504 has a virtual location to the right of virtual screen 502. It may be desirable to transition frame 506 from one virtual screen to another virtual screen. For example, when frame 506 is displaying information related to virtual screen 502, a user may desire frame 506 to display information related to virtual screen 504. In such an example, receiving input, for example input 620 of FIG. 6B, input 640 of FIG. 6C, and/or the like, indicating panning frame 506 beyond the right border of virtual screen 502 may indicate a transition from virtual screen 502 to virtual screen 504. In another example, receiving input indicating panning frame 506 beyond the left border of virtual screen 504 may indicate a transition from virtual screen 504 to virtual screen 502.

FIG. 5B is a diagram illustrating an arrangement 520 of virtual locations for frame 526 and virtual screens 522 and 524. Frame 526 may relate to a frame that displays part of virtual screen 522 and/or 524, for example similar to block 304 and block 302 of FIG. 3B. Virtual screens 522 and 524 may be related by a virtual location. For example, in the example of FIG. 5B, virtual screen 524 has a virtual location below virtual screen 522. It may be desirable to transition frame 526 from one virtual screen to another virtual screen. For example, when frame 526 is displaying information related to virtual screen 522, a user may desire frame 526 to display information related to virtual screen 524. In such an example, receiving input, for example input 620 of FIG. 6B, input 640 of FIG. 6C, and/or the like, indicating panning frame 526 beyond the bottom border of virtual screen 522 may indicate a transition from virtual screen 522 to virtual screen 524. In another example, receiving input indicating panning frame 526 beyond the top border of virtual screen 524 may indicate a transition from virtual screen 524 to virtual screen 522.

FIG. 5C is a diagram illustrating an arrangement 540 of virtual locations for frame 550 and virtual screens 542, 544, 546, and 548. Frame 550 may relate to a frame that displays a part of virtual screen 542, 544, 546 and/or 548, for example similar to block 304 and block 302 of FIG. 3C. Virtual screens 542, 544, 546, and 548 may be related by a virtual location. For example, in the example of FIG. 5C, virtual screen 544 has a virtual location to the right of virtual screen 542 and above virtual screen 548 and virtual screen 546 has a virtual location below virtual screen 542 and to the left of virtual screen 548. It may be desirable to transition frame 550 from one virtual screen to another virtual screen. For example, when frame 550 is displaying information related to virtual screen 542, a user may desire frame 550 to display information related to virtual screen 544. In such an example, receiving input, for example input 620 of FIG. 6B, input 640 of FIG. 6C, and/or the like, indicating panning frame 550 beyond the bottom border of virtual screen 542 may indicate a transition from virtual screen 542 to virtual screen 546. In another example, receiving input indicating panning frame 550 beyond the right border of virtual screen 542 may indicate a transition from virtual screen 542 to virtual screen 544.

Figure 6A:
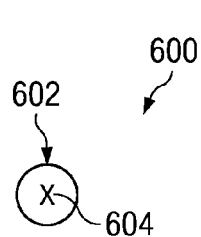
FIGS. 6A-6C are diagrams illustrating input from a touch display according to an example embodiment.
Figure 6B:
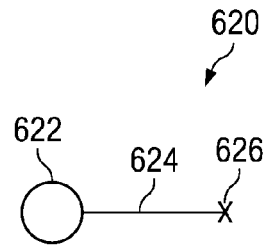
Figure 6C:
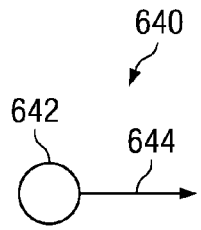
Figure 7:
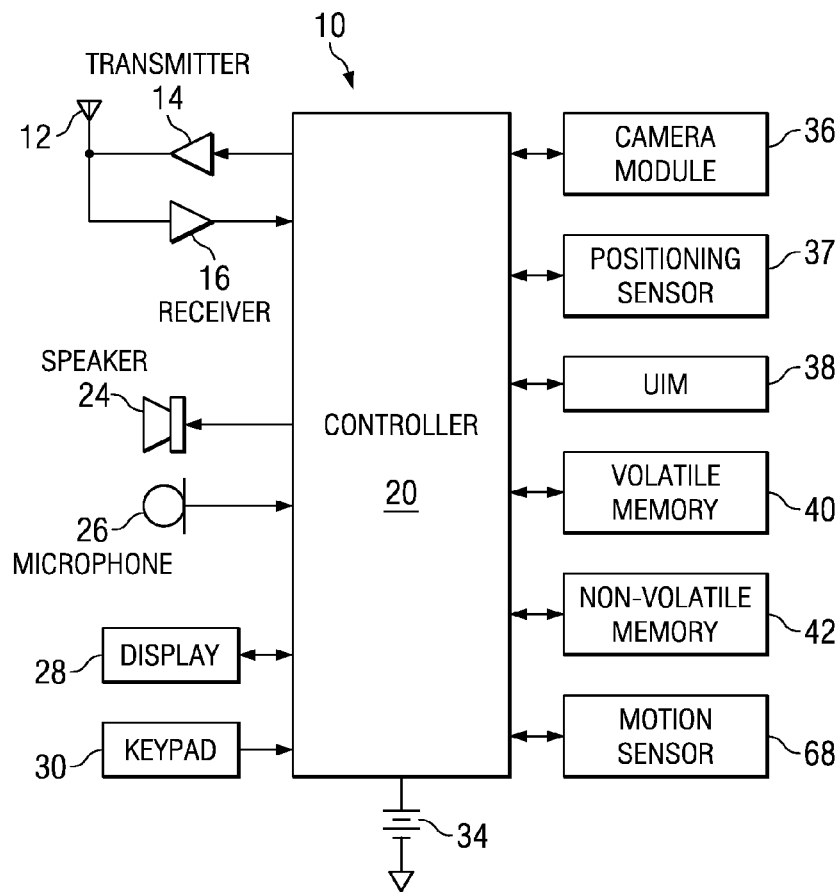
FIG. 7 is a block diagram showing an electronic device according to an example embodiment.

FIGS. 6A-6C are diagrams illustrating input from a touch display, for example from display 28 of FIG. 7, according to an example embodiment of the invention. In FIGS. 6A-6C, an input related to contact with a touch display is shown with a circle, an input related to releasing a contact from a touch display is shown with two crossed lines, and input related to movement on a touch display is shown with a line.

In the example of FIG. 6A, input 600 relates to receiving contact input 602 and receiving a release input 604 are shown. In this example, contact input 602 and release input 604 occur at the same position. In an example embodiment, the time between receiving contact input 602 and release input 604 may be utilized. For example, input 600 of FIG. 6A may be interpreted as a tap for a short time between contact input 602 and release input 604, a press for less short time between contact input 602 and release input 604, and/or the like. In such an example, a tap input may induce one operation, such as selecting an item, and a press input may induce another operation, such as performing an operation on an item.

In the example of FIG. 6B, input 620 relates to receiving contact input 622, a movement input 624, and a release input 626 are shown. In this example, contact input 622 and release input 626 occur at different positions. Input 620 may be utilized to drag an object from one position to another, to move a scroll bar, to pan a virtual screen, and/or the like. In an example embodiment, input 620 of FIG. 6B is interpreted differently based at least in part on the speed of movement 624. For example, if input 620 is utilized to pan a virtual screen, the panning motion may be small for a slow movement, large for a fast movement, and/or the like.

In the example of FIG. 6C, input 640 relates to receiving contact input 642, and a movement input 644, where contact is released during movement. Input 640 may be utilized to move an object from one position to another, to move a scroll bar, to pan a virtual screen, and/or the like. In an example embodiment, input 640 of FIG. 6C is interpreted differently based at least in part on the speed of movement 644. For example, if input 640 is utilized to pan a virtual screen, the panning motion may be small for a slow movement, large for a fast movement, and/or the like.

FIG. 7 is a block diagram showing an electronic device 10 according to an example embodiment of the invention. It should be understood, however, that a electronic device as illustrated and hereinafter described is merely illustrative of an electronic device that would benefit from embodiments of the present invention and, therefore, should not be taken to limit the scope of the present invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, cameras, video recorders, global positioning system (GPS) devices and other types of electronic systems, may readily employ embodiments of the present invention. Furthermore, devices may readily employ embodiments of the present invention regardless of their intent to provide mobility.

Even though embodiments herein are described in conjunction with mobile communications applications, it should be understood that embodiments of the present invention may be utilized in conjunction with a variety of other applications, both in the mobile communications industries and outside of the mobile communications industries.

Device may also include a positioning sensor 37, non-volatile memory 42, and motion sensor 68.

The electronic device 10 comprises an antenna 12 (or multiple antennae) in operable communication with a transmitter 14 and a receiver 16. The electronic device 10 further comprises a controller 20 or other processing element that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with second-generation (2G) wireless communication protocols IS-136 (TDMA), GSM, and IS-95 (CDMA), or with third-generation (3G) wireless communication protocols, such as UMTS, CDMA2000, WCDMA and TD-SCDMA, with fourth-generation (4G) wireless communication protocols, wireless networking protocols, such as 802.11, short-range wireless protocols, such as Bluetooth, and/or the like.

It is understood that the controller 20 comprises circuitry desirable for implementing audio, video, communication, navigation, logic functions, and or the like. For example, the controller 20 may comprise a digital signal processor device, a microprocessor device, various analog to digital converters, digital to analog converters, and other support circuits. Control and signal processing functions of the electronic device 10 are allocated between these devices according to their respective capabilities. The controller 20 thus may also comprise the functionality to encode and interleave message and data prior to modulation and transmission. The controller 20 may additionally comprise an internal voice coder, and may comprise an internal data modem. Further, the controller 20 may comprise functionality to operate one or more software programs, which may be stored in memory. For example, the controller 20 may operate a connectivity program, such as a conventional internet browser. The connectivity program may then allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the controller 20. The user input interface, which allows the electronic device 10 to receive data, may comprise any of a number of devices allowing the electronic device 10 to receive data, such as a keypad 30, a touch display, for example if display 28 comprises touch capability, and/or the like. In an embodiment comprising a touch display, the touch display, the touch display may be configured to receive input from a single point of contact, multiple points of contact, and/or the like. In such an embodiment, the touch display may determine input based on position, motion, speed, contact area, and/or the like. In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the controller 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 comprises hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the controller 20 in the form of software for creating a digital image file from a captured image. In an example embodiment, the camera module 36 may further comprise a processing element such as a coprocessor which assists the controller 20 in processing image data and an encoder and/or decoder for compressing and/or decompressing image data. The encoder and/or decoder may encode and/or decode according to a standard format, for example, a JPEG standard format.

The electronic device 10 may comprise one or more user identity modules (UIM) 38. UIM 38 may comprise information stored in memory of electronic device 10, a part of electronic device 10, a device coupled with electronic device 10, and/or the like. UIM 38 may comprise a memory device having a built in processor. UIM 38 may comprise, for example, a subscriber identity module (SIM), a universal integrated circuit card (UICC), a universal subscriber identity module (USIM), a removable user identity module (R-UIM), and/or the like. UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM 38 and disable usage of a second UIM 38. Usage of more than one UIM 38 may comprise concurrent utilization of information related to a first UIM 38 and a second UIM 38.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may additionally or alternatively comprise an EEPROM, flash memory or the like. The memories may store any of a number of pieces of information, and data. The information and data may be used by the electronic device 10 to implement the functions of the electronic device 10. For example, the memories may comprise an identifier, such as an international mobile equipment identification (IMEI) code, which may uniquely identify the electronic device 10.

Although FIG. 7 illustrates an example of an electronic device which may utilize embodiments of the present invention, it should be understood that the electronic device 10 of FIG. 7 is merely an example device that may utilize embodiments of the present invention.

A processing element such as those described may be embodied in various ways. For example, the processing element may be embodied as a processor, a coprocessor, a controller or various other processing means or devices including integrated circuits such as, for example, an ASIC (application specific integrated circuit), FPGA (field programmable gate array), and/or the like.

Without in any way limiting the scope, interpretation, or application of the claims appearing below, it is possible that a technical effect of one or more of the example embodiments disclosed herein may be allowing a user to transition between user identities by transition between virtual screens. Another possible technical effect of one or more of the example embodiments disclosed herein may be providing a simple way for a user to transition between user identities. Another technical effect of one or more of the example embodiments disclosed herein may be providing a simple way for a user to determine which user identity is being used.

Embodiments of the present invention may be implemented in software, hardware, application logic or a combination of software, hardware and application logic. The software, application logic and/or hardware may reside on an electronic device, UIM, or another UIM. If desired, part of the software, application logic and/or hardware may reside on an electronic device, part of the software, application logic and/or hardware may reside on a UIM, and part of the software, application logic and/or hardware may reside on another UIM. The application logic, software or an instruction set is preferably maintained on any one of various conventional computer-readable media. In the context of this document, a "computer-readable medium" may be any media or means that can contain, store, communicate, propagate or transport the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the invention as defined in the appended claims.

What is claimed is:

1. An apparatus, comprising:
a processor and at least one memory that contains executable instructions that if executed by the processor cause the apparatus to:
associate a first virtual screen with a first user identity;
associate a second virtual screen with a second user identity;
display said first virtual screen while said first user identity is active;
enable panning a frame beyond a boundary of said first virtual screen; and
transition, in response to the panning of the frame and without any additional user input, from said first virtual screen to said second virtual screen;
wherein the transitioning from said first virtual screen to said second virtual screen deactivates said first user identity and engages said second user identity.

2. The apparatus of claim 1, wherein said associating said first virtual screen with said first user identity comprises utilizing information related to said first user identity.

3. The apparatus of claim 1, wherein said associating said second virtual screen with said second user identity comprises utilizing information related to said second user identity.

4. The apparatus of claim 1, wherein said processor is further configured to display information associated with said first virtual screen.

5. The apparatus of claim 4, wherein said displaying comprises utilizing a frame related to said first virtual screen to display at least part of said virtual screen.

6. The apparatus of claim 1, wherein said processor is further configured to transition from said first virtual screen to said second virtual screen in response to said input.

7. The apparatus of claim 6, wherein said transitioning comprises utilizing a frame related to said first virtual screen to display at least part of said virtual screen.

8. The apparatus of claim 1, wherein said transition relates to a movement towards a virtual location of said second virtual screen to indicate said transition.

9. The apparatus of claim 1, wherein the apparatus is contained in a wireless mobile communication device, and wherein the respective first and second user identities are associated with respective subscriber identity modules of the wireless mobile communication device.

10. The apparatus of claim 9, wherein the subscriber identity modules associated with the first and second user identities are simultaneously present in the wireless mobile communication device.

11. A method, comprising:
associating a first virtual screen with a first user identity;
associating a second virtual screen with a second user identity;
displaying said first virtual screen while said first user identity is engaged;
enabling panning a frame beyond a boundary of said first virtual screen; and
transitioning, in response to the panning and without any additional user input, from said first virtual screen to said second virtual screen;
wherein the transitioning from said first virtual screen to said second virtual screen disengages said first user identity and engages said second user identity.

12. The method of claim 11, wherein said associating said first virtual screen with said first user identity comprises utilizing information related to said first user identity.

13. The method of claim 11, wherein said associating said second virtual screen with said second user identity comprises utilizing information related to said second user identity.

14. The method of claim 11, further comprising displaying information associated with said first virtual screen.

15. The method of claim 11, wherein said received input relates to a touch display input.

16. The method of claim 11, wherein said received input relates to a movement towards a virtual location of said second virtual screen to indicate said transition.

17. The method of claim 11, wherein said transitioning relates to panning a frame beyond a boundary of said first virtual screen to indicate said transition.

18. The method of claim 11, wherein the respective first and second user identities are associated with respective subscriber identity modules of a wireless mobile communication device.

19. A computer product comprising a non-transitory computer-readable medium bearing computer program code embodied therein for use with a computer, the computer program code comprising:

code for associating a first virtual screen with a first user identity;
code for associating a second virtual screen with a second user identity;
code for displaying said first virtual screen while said first user identity is engaged;
code for enabling panning a frame beyond a boundary of said first virtual screen; and
code for transitioning, in response to said panning of said frame beyond a boundary of said first virtual screen and without any additional user input, from said first virtual screen to said second virtual screen;
code for, in response to transitioning from said first virtual screen to said second virtual screen, disengaging said first user identity and engaging said second user identity.

20. The computer program product of claim 19, wherein said associating said first virtual screen with said first user identity comprises utilizing information related to said first user identity.

21. The computer program product of claim 19, wherein said associating said second virtual screen with said second user identity comprises utilizing information related to said second user identity.

22. The computer program product of claim 19, wherein the respective first and second user identities are associated with respective subscriber identity modules of a wireless mobile communication device.

23. A non-transitory computer-readable medium encoded with instructions designed to result in the implementation of operations comprising:
associating a first virtual screen with a first user identity;
associating a second virtual screen with a second user identity;
displaying said first virtual screen while said first user identity is engaged;
enabling panning a frame beyond a boundary of said first virtual screen; and
transitioning, in response to the panning and without any additional user input, from said first virtual screen to said second virtual screen;
wherein the transitioning from said first virtual screen to said second virtual screen disengages said first user identity and engages said second user identity.

24. The computer-readable medium of claim 23, wherein said associating said first virtual screen with said first user identity comprises utilizing information related to said first user identity.

25. The computer-readable medium of claim 23, wherein said associating said second virtual screen with said second user identity comprises utilizing information related to said second user identity.

26. The computer-readable medium of claim 23, wherein the respective first and second user identities are associated with respective subscriber identity modules of a wireless mobile communication device.

27. An apparatus, comprising:
means for associating a first virtual screen with a first user identity;
means for receiving input for transitioning from said first virtual screen to a second virtual screen;
means for associating said second virtual screen with a second user identity based at least in part on said input;
means for displaying said first virtual screen while said first user identity is engaged;
means for enabling panning a frame beyond a boundary of said first virtual screen;
means for transitioning, in response to panning of said frame beyond a boundary of said first virtual screen and without any additional user input, from said first virtual screen to said second virtual screen; and
means for, in response to transitioning from said first virtual screen to said second virtual screen, disengaging said first user identity and engaging said second user identity.

28. The apparatus of claim 27, wherein the respective first and second user identities are associated with respective subscriber identity modules of a wireless mobile communication device.

* * * * *

UNITED STATES PATENT AND TRADEMARK OFFICE
CERTIFICATE OF CORRECTION

| | | |
|---|---|---|
| PATENT NO. | : 10,489,053 B2 | Page 1 of 1 |
| APPLICATION NO. | : 12/274919 | |
| DATED | : November 26, 2019 | |
| INVENTOR(S) | : Samuels | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1297 days.

Signed and Sealed this
Fourteenth Day of July, 2020

Andrei Iancu
*Director of the United States Patent and Trademark Office*